(12) United States Patent
Ryu et al.

(10) Patent No.: US 11,326,025 B2
(45) Date of Patent: May 10, 2022

(54) POLYAMIDEIMIDE COPOLYMER AND POLYAMIDEIMIDE FILM COMPRISING THE SAME

(71) Applicant: LG CHEM, LTD., Seoul (KR)

(72) Inventors: Bi Oh Ryu, Daejeon (KR); Soon Yong Park, Daejeon (KR); Young Ji Tae, Daejeon (KR); Young Seok Park, Daejeon (KR); Kwan Yeol Paek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 802 days.

(21) Appl. No.: 16/079,810

(22) PCT Filed: Jan. 31, 2018

(86) PCT No.: PCT/KR2018/001346
§ 371 (c)(1),
(2) Date: Aug. 24, 2018

(87) PCT Pub. No.: WO2018/155830
PCT Pub. Date: Aug. 30, 2018

(65) Prior Publication Data
US 2021/0189067 A1     Jun. 24, 2021

(30) Foreign Application Priority Data
Feb. 24, 2017 (KR) .......................... 10-2017-0024908

(51) Int. Cl.
*C08G 73/14* (2006.01)
*C08J 5/18* (2006.01)

(52) U.S. Cl.
CPC ................ *C08G 73/14* (2013.01); *C08J 5/18* (2013.01); *C08J 2379/08* (2013.01); *C08J 2479/08* (2013.01)

(58) Field of Classification Search
CPC ...... C08G 73/14; C08G 73/10; C08J 2379/08; C08J 2479/08
See application file for complete search history.

(56) References Cited

U.S. PATENT DOCUMENTS

| | | | |
|---|---|---|---|
| 9,051,425 | B2 | 6/2015 | Cho et al. |
| 9,334,370 | B2 | 5/2016 | Cho et al. |
| 2010/0018756 | A1* | 1/2010 | Shimeno ................ B32B 27/18 174/254 |
| 2010/0159223 | A1 | 6/2010 | Keese et al. |
| 2012/0244330 | A1 | 9/2012 | Sun et al. |
| 2012/0296050 | A1 | 11/2012 | Cho et al. |
| 2014/0243482 | A1 | 8/2014 | Park et al. |
| 2016/0039977 | A1* | 2/2016 | Cho ........................ C08G 69/32 525/432 |
| 2016/0075826 | A1 | 3/2016 | Sun et al. |
| 2016/0194448 | A1* | 7/2016 | Song .................. C08G 73/1042 428/337 |
| 2016/0222249 | A1 | 8/2016 | Choi et al. |
| 2017/0130004 | A1 | 5/2017 | Choi et al. |
| 2018/0194900 | A1 | 7/2018 | Choi et al. |

FOREIGN PATENT DOCUMENTS

| | | |
|---|---|---|
| EP | 3045490 A1 | 7/2016 |
| JP | H07-041559 A | 2/1995 |
| JP | H07-165915 A | 6/1995 |
| JP | 09-118748 A | 5/1997 |
| JP | 11-158268 A | 6/1999 |
| JP | 2014-528490 A | 10/2014 |
| JP | 2015-037874 A | 2/2015 |
| JP | 2016-056358 A | 4/2016 |
| KR | 10-2013-0029129 A | 3/2013 |
| KR | 10-2013-0071650 A | 7/2013 |
| KR | 10-2014-0015492 A | 2/2014 |
| KR | 10-1523730 B1 | 5/2015 |
| KR | 10-2015-0065975 A | 6/2015 |
| KR | 10-2016-0094086 A | 8/2016 |
| KR | 10-2017-0003272 A | 1/2017 |
| KR | 10-2018-0086996 A | 8/2018 |

OTHER PUBLICATIONS

European Search Report issued for European Patent Application No. 18737488.9 dated Mar. 13, 2019, 5 pages.
International Search Report and Written Opinion issued for PCT/KR2018/001346 dated Jun. 11, 2018, 9 pages.

\* cited by examiner

*Primary Examiner* — Gregory Listvoyb
(74) *Attorney, Agent, or Firm* — Rothwell, Figg, Ernst & Manbeck, P.C.

(57) ABSTRACT

The present invention relates to a polyamideimide copolymer and a colorless and transparent polyamideimide copolymer film. The polyamideimide copolymer according to the present invention enables to provide a polyamideimide film having improved UV shielding function while exhibiting excellent scratch resistance and mechanical properties.

5 Claims, 1 Drawing Sheet

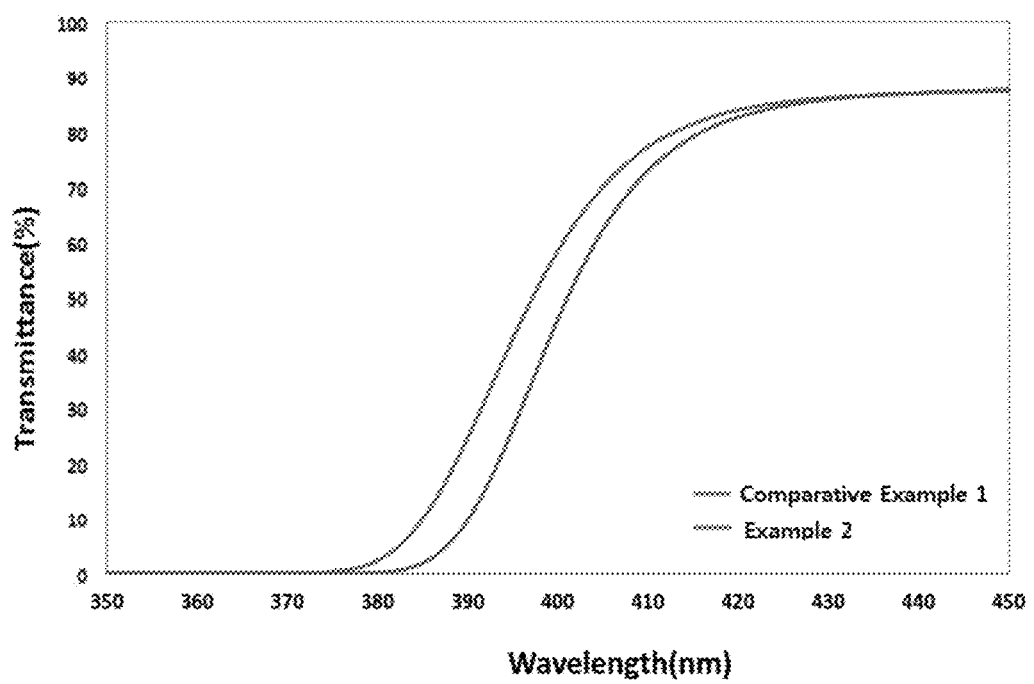

POLYAMIDEIMIDE COPOLYMER AND POLYAMIDEIMIDE FILM COMPRISING THE SAME

CROSS-REFERENCE TO RELATED APPLICATION(S)

This application is a 35 U.S.C. § 371 National Phase Entry Application from PCT/KR2018/001346, filed on Jan. 31, 2018, and designating the United States, which claims the benefit of priority from Korean Patent Application No. 10-2017-0024908 filed on Feb. 24, 2017 with the Korean Intellectual Property Office, the full disclosures of which are incorporated herein by reference in their entirety.

TECHNICAL FIELD

The present invention relates to a polyamideimide copolymer and a polyamideimide film comprising the same.

BACKGROUND ART

Aromatic polyimide resins are polymers having mostly an amorphous structure and exhibits excellent heat resistance, chemical resistance, electrical properties, and dimensional stability due to their rigid chain structure. Thus, these polyimide resins are widely used as electric/electronic materials.

However, the polyimide resins have many limitations in their use because they may appear dark brown in color due to charge-transfer complex(CTC) formation of $\pi$ electrons present in the imide chain.

In order to solve the above limitation and obtain a colorless and transparent polyimide resin, there have been proposed a method of introducing a strong electron withdrawing group such as a trifluoromethyl ($-CF_3$) group to restrict the movement of $\pi$ electrons; a method of introducing a sulfone ($-SO_2-$) group, an ether ($-O-$) group or the like into the main chain to form a curved structure, thereby reducing the formation of CTC; or a method of introducing an aliphatic cyclic compound to inhibit the formation of resonance structure of $\pi$ electrons, etc.

However, it was difficult for the polyimide resins produced according to the above proposals to exhibit sufficient heat resistance due to a curved structure or an aliphatic ring compound, and a film produced using the polyimide resins still have limitations in exhibiting poor mechanical properties.

Accordingly, in recent years, to improve the scratch resistance of polyimide, a polyamideimide copolymer into which a polyamide unit structure is introduced has been developed.

However, when the polyamide unit structure is introduced into the polyimide, the scratch resistance is improved, but there is a limitation in securing UV shielding function.

Accordingly, there is a continuing need to develop a polyamideimide copolymer that can improve UV shielding function simultaneously while enhancing scratch resistance and mechanical properties.

DETAILED DESCRIPTION OF THE INVENTION

Technical Problem

It is one object of the present invention to provide a polyamideimide copolymer having improved UV shielding function while exhibiting excellent scratch resistance and mechanical properties.

It is another object of the present invention to provide a polyamideimide film comprising the polyamideimide copolymer.

Technical Solution

According to the present invention, there is provided a polyamideimide copolymer which is an imidization product of polyamic acid obtained by copolymerizing an aromatic diamine monomer, an aromatic dianhydride monomer, and an aromatic dicarbonyl monomer, wherein the aromatic dicarbonyl monomer is contained in an amount of 51 mol % or more based on the total moles of the aromatic dianhydride monomer and the aromatic dicarbonyl monomer, and the aromatic dicarbonyl monomer comprises 10 mol % to 50 mol % of 4,4'-biphenyldicarbonyl chloride, 10 mol % to 30 mol % of isophthaloyl chloride, and 40 mol % to 60 mol % of terephthaloyl chloride.

Also, according to the present invention, there is provided a polyamideimide film comprising the polyamideimide copolymer.

Hereinafter, the polyamideimide copolymer and the polyamideimide film comprising the same according to embodiments of the present invention will be described in detail.

First, unless explicitly stated otherwise, the terminology used in the description is for the purpose of describing particular embodiments, and is not intended to limit the scope of the present invention.

The singular forms used herein are intended to include the plural forms as well, unless the context clearly indicates to the contrary.

It will be further understood that the meaning of the terms "comprise", "include" as used herein is intended to specify the presence of stated features, ranges, integers, steps, operations, elements, and/or components, but does not preclude the presence or addition of other features, ranges, integers, steps, operations, elements, components, and/or groups.

According to one embodiment of the present invention, there is provided a polyamideimide copolymer which is an imidization product of polyamic acid obtained by copolymerizing an aromatic diamine monomer, an aromatic dianhydride monomer, and an aromatic dicarbonyl monomer, wherein the aromatic dicarbonyl monomer is contained in an amount of 51 mol % or more based on the total moles of the aromatic dianhydride monomer and the aromatic dicarbonyl monomer, and the aromatic dicarbonyl monomer comprises 10 mol % to 50 mol % of 4,4'-biphenyldicarbonyl chloride, 10 mol % to 30 mol % of isophthaloyl chloride, and 40 mol % to 60 mol % of terephthaloyl chloride.

As a result of continuous study by the present inventors, it was found that, when an aromatic dicarbonyl monomer having a specific composition is applied during the formation of a polyamideimide copolymer using an aromatic diamine monomer, an aromatic dianhydride monomer, and an aromatic dicarbonyl monomer, a copolymer having an excellent UV shielding function while exhibiting excellent scratch resistance and high mechanical properties can be prepared.

That is, the aromatic dicarbonyl monomer having a specific composition prescribed according to embodiment of the present invention enables the formation of a colorless and transparent polyamideimide copolymer while increasing UV-cut slope as well as mechanical properties.

According to one embodiment, the polyamideimide copolymer is an imidization product of polyamic acid obtained copolymerizing an aromatic diamine monomer, an aromatic dianhydride monomer, and an aromatic dicarbonyl monomer.

The polyamic acid may be a block copolymer or a random copolymer.

For example, the block copolymer of polyamic acid may include a first unit structure derived from copolymerization of the aromatic diamine monomer and the aromatic dianhydride monomer; and a second unit structure derived from copolymerization of the aromatic diamine monomer and the aromatic dicarbonyl monomer.

In addition, the random copolymer of polyamic acid may include a unit structure in which the aromatic diamine monomer, the aromatic dianhydride monomer, and the aromatic dicarbonyl monomer independently form an amide bond and are randomly copolymerized.

The polyamic acid forms a polyamideimide copolymer having both an imide bond and an amide bond by imidization.

Herein, the aromatic dicarbonyl monomer is contained in an amount of 51 mol % or more based on the total moles of the aromatic dianhydride monomer and the aromatic dicarbonyl monomer. When the aromatic dicarbonyl monomer is contained in an amount of less than 51 mol % based on the total moles of the aromatic dianhydride monomer and the aromatic dicarbonyl monomer, mechanical properties such as surface hardness, elastic modulus and tensile strength, and optical properties such as yellow index and transmittance may be lowered as the hydrogen bonding force is relatively decreased.

Preferably, the aromatic dicarbonyl monomer may be contained in an amount of 60 mol % or more, 65 mol % or more, 67 mol % or more, or 70 mol % or more based on the total moles of the aromatic dianhydride monomer and the aromatic dicarbonyl monomer.

However, when the aromatic dicarbonyl monomer is used in an excessive amount, problems arise in that moisture resistance may be lowered or it may become opaque. Thus, it is preferable that the aromatic dicarbonyl monomer is contained in an amount of 90 mol % or less, or 85 mol % or less, or 80 mol % or less based on the total moles of the aromatic dianhydride monomer and the aromatic dicarbonyl monomer.

In particular, according to one embodiment, the aromatic dicarbonyl monomer comprises 4,4'-biphenyldicarbonyl chloride (BPC), isophthaloyl chloride (IPC), and terephthaloyl chloride (TPC). The isophthaloyl chloride (IPC) and terephthaloyl chloride (TPC) are compounds in which two carbonyl groups are bonded at the meta or para position of a phenylene group in the center.

When the isophthaloyl chloride (IPC) and terephthaloyl chloride (TPC) are used as the aromatic dicarbonyl monomers, they can exhibit advantageous effects in enhancing processability attributed to the meta bond in the copolymer and enhancing mechanical properties attributed to the para bond, but there was a limitation in securing UV-cut performance.

Thus, when the 4,4'-biphenyldicarbonyl chloride (BPC), which is a compound in which two carbonyl groups are bonded at the para position of a biphenylene group in the center, is additionally used as the aromatic dicarbonyl monomer, the 4,4'-biphenyldicarbonyl chloride (BPC) has higher crystallinity than the isophthaloyl chloride (IPC) and terephthaloyl chloride (TPC), thereby increasing the UV-cut slope while further enhancing the hardness of the polyamideimide copolymer.

Further, according to one embodiment, the aromatic dicarbonyl monomer comprises 10 mol % to 50 mol % of 4,4'-biphenyldicarbonyl chloride (BPC), 10 mol % to 30 mol % of isophthaloyl chloride (IPC), and 40 mol % to 60 mol % of terephthaloyl chloride (TPC).

That is, the 4,4'-biphenyldicarbonyl chloride (BPC), isophthaloyl chloride (IPC), and terephthaloyl chloride (TPC), each constituting the aromatic dicarbonyl monomer, can enhance the hardness and mechanical properties and improve UV shielding function even while maintaining transparency and yellow index of the polyamideimide copolymer when used within the molar range above.

In particular, when 4,4'-biphenyldicarbonyl chloride (BPC) is contained in an amount of less than 10 mol % based on the total moles of the aromatic dicarbonyl monomer, the effect of enhancing scratch resistance and mechanical properties is insufficient, and when it is contained in an amount exceeding 50 mol %, a problem arises in that haze of the film after coating and curing is high.

Accordingly, the 4,4'-biphenyldicarbonyl chloride (BPC) may be contained an amount of 10 mol % or more, 12 mol % or more, or 14 mol % or more; and 50 mol % or less, or 45 mol % or less based on the total moles of the aromatic dicarbonyl monomer.

Further, the isophthaloyl chloride (IPC) may be contained in an amount of 10 mol % or more, or 14 mol % or more; and 30 mol % or less based on the total moles of the aromatic dicarbonyl monomer.

Furthermore, the terephthaloyl chloride (TPC) may be contained an amount of 40 mol % or more, or 42 mol % or more; and 60 mol % or less, or 58 mol % or less based on the total moles of the aromatic dicarbonyl monomer.

In addition, according to one embodiment, in the polyamideimide copolymer, the molar ratio of (the aromatic diamine monomer):(the aromatic dianhydride monomer and the aromatic dicarbonyl monomer) may be 1:0.95 to 1:1.05. Specifically, in the polyamideimide copolymer, the molar ratio of (the aromatic diamine monomer):(the aromatic dianhydride monomer and the aromatic dicarbonyl monomer) may be 1:1.

As described above, in the polyamideimide copolymer according to one embodiment, the composition of the aromatic dicarbonyl monomer must satisfy the following two conditions simultaneously in order to exhibit excellent hardness and mechanical properties, excellent scratch resistance (high-grade pencil hardness), and superior UV shielding function:

(i) the aromatic dicarbonyl monomer is contained in an amount of 51 mol % or more based on the total moles of the aromatic dianhydride monomer and the aromatic dicarbonyl monomer, and (ii) the aromatic dicarbonyl monomer is composed of 10 mol % to 50 mol % of 4,4'-biphenyldicarbonyl chloride (BPC), 10 mol % to 30 mol % of isophthaloyl chloride (IPC), and 40 mol % to 60 mol % of terephthaloyl chloride (TPC).

Meanwhile, according to one embodiment, the aromatic diamine monomer may be 2,2'-bis(trifluoromethyl)-4,4'-biphenyldiamine (TFDB), 1,3-cyclohexanediamine (13CHD), or meta-methylenediamine (mMDA). Among them, it is preferable to use 2,2'-bis(trifluoromethyl)-4,4'-biphenyldiamine (TFDB) as the aromatic diamine monomer in view of enhancing the hardness and maintaining a low yellow index.

Further, the aromatic dianhydride monomer may be 3,3',4,4'-biphenyltetracarboxylic acid dianhydride (BPDA), cyclobutane-1,2,3,4-tetracarboxylic dianhydride (CBDA), or (2,2'-bis(3,4-dicarboxyphenyl)hexafluoropropane dianhydride (6FDA). Among them, it is preferable to use 3,3',4,4'-biphenyltetracarboxylic acid dianhydride (BPDA) as the aromatic dianhydride monomer in view of enhancing UV shielding property, UV weather resistance, and chemical imidization processability.

The 2,2'-bis(trifluoromethyl)-4,4'-biphenyldiamine, which is the aromatic diamine monomer, and 3,3',4,4'-biphenyltetracarboxylic acid dianhydride, which is the aromatic dianhydride monomer, are advantageous for expressing the properties described above by copolymerization of the aromatic dicarbonyl monomer composed of 4,4'-biphenyldicarbonyl chloride (BPC), isophthaloyl chloride (IPC), and terephthaloyl chloride (TPC).

Meanwhile, the polymerization conditions for forming polyamic acid in which the aromatic diamine monomer, the aromatic dianhydride monomer, and the aromatic dicarbonyl monomer are copolymerized are not particularly limited.

Preferably, the polymerization for forming the polyamic acid may be carried out by solution polymerization at 1° C. to 100° C. under an inert atmosphere.

As a solvent for forming the polyamic acid, N,N-dimethylformamide, dimethylacetamide, dimethylsulfoxide, acetone, N-methyl-2-pyrrolidone, tetrahydrofuran, chloroform, gamma-butyrolactone and the like may be used.

Imidization after the formation of the polyamic acid can be carried out thermally or chemically. For example, a compound such as acetic anhydride and pyridine may be used for chemical imidization.

According to one embodiment, the polyamideimide copolymer may have a weight average molecular weight of 10,000 g/mol to 1,000,000 g/mol, or 50,000 g/mol to 1,000,000 g/mol, or 50,000 g/mol to 500,000 g/mol, or 50,000 g/mol to 300,000 g/mol.

Such a polyamideimide copolymer can provide a polyamideimide film having improved UV shielding function while exhibiting excellent scratch resistance and high mechanical properties.

Specifically, the polyamideimide copolymer including the polyamideimide copolymer may have a pencil hardness of 2H or higher, as measured for a film specimen having a thickness of 25 to 55 μm according to ASTM D3363.

Further, the polyamideimide film may have a tensile strength of 180 MPa or more, as measured for a film specimen having a thickness of 25 to 55 μm according to ASTM D638. Preferably, the tensile strength may be 190 Mpa or more, 200 Mpa or more, or 220 Mpa or more. As the tensile strength increases, the mechanical properties become superior. Thus, there is no limitation in the upper limit. However, the tensile strength may be, for example, 300 MPa or less, 280 MPa or less, or 270 MPa or less.

Furthermore, the polyamideimide film may have a tensile elongation of 18% or more, as measured for a film specimen having a thickness of 25 to 55 μm according to ASTM D638. Preferably, the tensile elongation may be 20% or more, 22% or more, or 25% or more. As the tensile elongation increases, the mechanical properties become superior. Thus, there is no limitation in the upper limit. However, the tensile strength may be, for example, 35% or less, 33% or less, or 30% or less.

In addition, the polyamideimide film may have a UV-cut slope (dT/dλ) measured for a film specimen having a thickness of 25 μm to 55 μm according to ASTM E424, of 2.80 or more in the range of 10% to 80% transmittance. Moreover, at this time, the UV-cut off wavelength (wavelength when the transmittance is less than 1%) may be 353 nm to 355 nm. Specifically, as can be seen in Examples and Comparative examples described later, films including the polyamideimide copolymer using a combination of the aromatic dicarbonyl monomer composed of 4,4'-biphenyldicarbonyl chloride (BPC), isophthaloyl chloride (IPC), and terephthaloyl chloride (TPC) can have a UV-cut slope (dT/dλ) higher than that of films including the polyamideimide copolymer without using the combination of the aromatic dicarbonyl monomer. The UV-cut slope (dT/dλ) and the UV-cut off wavelength can be confirmed through the graph showing the results after measuring the transmittance of the wavelength.

According to another embodiment of the present invention, there is provided a colorless and transparent polyamideimide film comprising the above-described polyamideimide copolymer.

As described above, as a result of continuous study by the present inventors, it was found that, when an aromatic dicarbonyl monomer having a specific composition is applied during the formation of the polyamideimide copolymer using an aromatic diamine monomer, an aromatic dianhydride monomer, and an aromatic dicarbonyl monomer, a copolymer having an excellent UV shielding function while exhibiting excellent scratch resistance and high mechanical properties can be prepared.

Therefore, the film including the polyamideimide copolymer can be used as materials for various molded products that require high scratch resistance together with UV shielding function. For example, the polyamideimide film can be applied to a substrate for display, a protective film for display, a touch panel, and the like.

The polyamideimide film can be produced by a conventional method such as a dry method or a wet method using the polyamideimide copolymer. For example, the polyamideimide film may be obtained by coating a solution containing the copolymer onto an arbitrary support to form a film, and drying the solvent from the film by evaporation. If necessary, stretching and heat treatment may be carried out for the polyamideimide film.

Advantageous Effects

The polyamideimide copolymer according to the present invention can provide a polyamideimide film having improved UV shielding function while exhibiting excellent scratch resistance and mechanical properties.

BRIEF DESCRIPTION OF DRAWINGS

FIG. 1 shows the measurement result of transmittance of the polyamideimide films prepared in Example 2 and Comparative Example 1 relative to the wavelengths.

DETAILED DESCRIPTION OF THE EMBODIMENTS

Below, preferred examples are provided to aid in the understanding of the present invention. However, the following examples are provided only for illustration of the invention, and should not be construed as limiting the scope of the present invention.

Preparation of Polyamideimide Copolymer

Preparation Example 1

42.5 g of N,N-dimethylacetamide (DMAc) was filled into a 100 mL 4-neck round flask (reactor) equipped with a stirrer, a nitrogen injection device, a dropping funnel, a temperature controller and a condenser while passing nitrogen through the reactor. Then, the temperature of the reactor was adjusted to 25° C., and 4.3025 g (0.01343 mol) of 2,2'-bis(trifluoromethyl)-4,4'-biphenyldiamine (TFDB) was added and dissolved, and the resulting solution was maintained at 25° C.

Hereto, 1.1859 g (0.00403 mol) of 3,3',4,4'-biphenyltetracarboxylic acid dianhydride (BPDA) was added together, and then dissolved and reacted with stirring for a predetermined period of time. At this time, the temperature of the solution was maintained at 25° C.

Subsequently, the solution was cooled down to −10° C., and then 0.375 g (0.00134 mol) of biphenyldicarbonyl chloride (BPC), 1.0911 g (0.00537 mol) of terephthaloyl chloride (TPC), and 0.5455 g (0.00269 mol) of isophthaloyl chloride (IPC) were each added and stirred. A polyamic acid solution having a solid content of 15% by weight was obtained.

DMAc was added to the polyamic acid solution to dilute the solution to a solid content of 5% or less, and the resultant was precipitated with 10 L of methanol. The precipitated solids were filtered and dried at 100° C. under vacuum for 6 hours to obtain a solid-state polyamideimide copolymer (weight average molecular weight of about 121,441 g/mol).

Preparation Example 2

42.5 g of N,N-dimethylacetamide (DMAc) was filled into a 100 mL 4-neck round flask (reactor) equipped with a stirrer, a nitrogen injection device, a dropping funnel, a temperature controller and a condenser while passing nitrogen through the reactor. Then, the temperature of the reactor was adjusted to 25° C., and 4.2446 g (0.01325 mol) of 2,2'-bis(trifluoromethyl)-4,4'-biphenyldiamine (TFDB) was added and dissolved, and the resulting solution was maintained at 25° C.

Hereto, 1.17 g (0.003983 mol) of 3,3',4,4'-biphenyltetracarboxylic acid dianhydride (BPDA) was added together, and then dissolved and reacted with stirring for a predetermined period of time. At this time, the temperature of the solution was maintained at 25° C.

Subsequently, the solution was cooled down to −10° C., and then 0.740 g (0.00265 mol) of biphenyldicarbonyl chloride (BPC), 0.8073 g (0.00397 mol) of terephthaloyl chloride (TPC), and 0.5382 g (0.00265 mol) of isophthaloyl chloride (IPC) were each added and stirred. A polyamic acid solution having a solid content of 15% by weight was obtained.

DMAc was added to the polyamic acid solution to dilute the solution to a solid content of 5% or less, and the resultant was precipitated with 10 L of methanol. The precipitated solids were filtered and dried at 100° C. under vacuum for 6 hours to obtain a solid-state polyamideimide copolymer (weight average molecular weight of about 97,447 g/mol).

Preparation Example 3

42.5 g of N,N-dimethylacetamide (DMAc) was filled into a 100 mL 4-neck round flask (reactor) equipped with a stirrer, a nitrogen injection device, a dropping funnel, a temperature controller and a condenser while passing nitrogen through the reactor. Then, the temperature of the reactor was adjusted to 25° C., and 4.1883 g (0.01308 mol) of 2,2'-bis(trifluoromethyl)-4,4'-biphenyldiamine (TFDB) was added and dissolved, and the resulting solution was maintained at 25° C.

Hereto, 1.1544 g (0.003924 mol) of 3,3',4,4'-biphenyltetracarboxylic acid dianhydride (BPDA) was added together, and then dissolved and reacted with stirring for a predetermined period of time. At this time, the temperature of the solution was maintained at 25° C.

Subsequently, the solution was cooled down to −10° C., and then 1.0952 g (0.00392 mol) of biphenyldicarbonyl chloride (BPC), 0.7966 g (0.00392 mol) of terephthaloyl chloride (TPC), and 0.2655 g (0.001308 mol) of isophthaloyl chloride (IPC) were each added and stirred. A polyamic acid solution having a solid content of 15% by weight was obtained.

DMAc was added to the polyamic acid solution to dilute the solution to a solid content of 5% or less, and the resultant was precipitated with 10 L of methanol. The precipitated solids were filtered and dried at 100° C. under vacuum for 6 hours to obtain a solid-state polyamideimide copolymer (weight average molecular weight of about 88,736 g/mol).

Comparative Preparation Example 1

42.5 g of N,N-dimethylacetamide (DMAc) was filled into a 100 mL 4-neck round flask (reactor) equipped with a stirrer, a nitrogen injection device, a dropping funnel, a temperature controller and a condenser while passing nitrogen through the reactor. Then, the temperature of the reactor was adjusted to 25° C., and 4.3619 g (0.0136 mol) of 2,2'-bis(trifluoromethyl)-4,4'-biphenyldiamine (TFDB) was added and dissolved, and the resulting solution was maintained at 25° C.

Hereto, 1.2023 g (0.00408 mol) of 3,3',4,4'-biphenyltetracarboxylic acid dianhydride (BPDA) was added together, and then dissolved and reacted with stirring for a predetermined period of time. At this time, the temperature of the solution was maintained at 25° C. Subsequently, the solution was cooled to −10° C., and 1.3827 g (0.00681 mol) of terephthaloyl chloride (TPC) and 0.5531 g (0.00272 mol) of isophthaloyl chloride (IPC) were each added and stirred. A polyamic acid solution having a solid content of 15% by weight was obtained.

DMAc was added to the polyamic acid solution to dilute the solution to a solid content of 5% or less, and the resultant was precipitated with 10 L of methanol. The precipitated solids were filtered and dried at 100° C. under vacuum for 6 hours to obtain a solid-state polyamideimide copolymer (weight average molecular weight of about 88,147 g/mol).

Comparative Preparation Example 2

42.5 g of N,N-dimethylacetamide (DMAc) was filled into a 100 mL 4-neck round flask (reactor) equipped with a stirrer, a nitrogen injection device, a dropping funnel, a temperature controller and a condenser while passing nitrogen through the reactor. Then, the temperature of the reactor was adjusted to 25° C., and 4.1334 g (0.01290 mol) of 2,2'-bis(trifluoromethyl)-4,4'-biphenyldiamine (TFDB) was added and dissolved, and the resulting solution was maintained at 25° C.

Hereto, 1.1393 g (0.003872 mol) of 3,3',4,4'-biphenyltetracarboxylic acid dianhydride (BPDA) was added together, and then dissolved and reacted with stirring for a predetermined period of time. At this time, the temperature of the solution was maintained at 25° C.

Subsequently, the solution was cooled to −10° C., and then 1.4411 g (0.0051631 mol) of biphenyldicarbonyl chloride (BPC), 0.2621 g (0.001290 mol) of terephthaloyl chloride (TPC), and 0.5241 g (0.002581 mol) of isophthaloyl chloride (IPC) were each added and stirred. A polyamic acid solution having a solid content of 15% by weight was obtained.

DMAc was added to the polyamic acid solution to dilute the solution to a solid content of 5% or less, and the resultant was precipitated with 10 L of methanol. The precipitated solids were filtered and dried at 100° C. under vacuum for 6 hours to obtain a solid-state polyamideimide copolymer (weight average molecular weight of about 101,851 g/mol).

Comparative Preparation Example 3

42.5 g of N,N-dimethylacetamide (DMAc) was filled into a 100 mL 4-neck round flask (reactor) equipped with a stirrer, a nitrogen injection device, a dropping funnel, a temperature controller and a condenser while passing nitrogen through the reactor. Then, the temperature of the reactor was adjusted to 25° C., and 4.3320 g (0.01352 mol) of 2,2'-bis(trifluoromethyl)-4,4'-biphenyldiamine (TFDB) was added and dissolved, and the resulting solution was maintained at 25° C.

Hereto, 1.1940 g (0.00406 mol) of 3,3',4,4'-biphenyltetracarboxylic acid dianhydride (BPDA) was added together, and then dissolved and reacted with stirring for a predetermined period of time. At this time, the temperature of the solution was maintained at 25° C.

Subsequently, the solution was cooled down to −10° C., and then 0.1888 g (0.00068 mol) of biphenyldicarbonyl chloride (BPC), 1.0986 g (0.00541 mol) of terephthaloyl chloride (TPC), and 0.686 g (0.00338 mol) of isophthaloyl chloride (IPC) were each added and stirred. A polyamic acid solution having a solid content of 15% by weight was obtained.

DMAc was added to the polyamic acid solution to dilute the solution to a solid content of 5% or less, and the resultant was precipitated with 10 L of methanol. The precipitated solids were filtered and dried at 100° C. under vacuum for 6 hours to obtain a solid-state polyamideimide copolymer (weight average molecular weight of about 79,171 g/mol).

The following Table 1 summarizes the content of monomers used in the

Preparation Examples 1 to 3 and Comparative Preparation Examples 1 to 3.

TABLE 1

| | Molar ratio of | (Based on total moles of BPDA + BPC + IPC + TPC) | | | | (Based on total moles of BPC + IPC + TPC) | | |
|---|---|---|---|---|---|---|---|---|
| | (TFDB):(BPDA + BPC + IPC + TPC) | BPDA (mole %) | BPC (mole %) | IPC (mole %) | TPC (mole %) | BPC (mole %) | IPC (mole %) | TPC (mole %) |
| Preparation Example 1 | 1:1 | 30.0 | 10.0 | 20.0 | 40.0 | 14.3 | 28.6 | 57.1 |
| Preparation Example 2 | 1:1 | 30.0 | 20.0 | 20.0 | 30.0 | 28.6 | 28.6 | 42.8 |
| Preparation Example 3 | 1:1 | 30.0 | 30.0 | 10.0 | 30.0 | 42.85 | 14.3 | 42.85 |
| Comparative Preparation Example 1 | 1:1 | 30.0 | — | 20.0 | 50.0 | — | 28.5 | 71.5 |
| Comparative Preparation Example 2 | 1:1 | 30.0 | 40.0 | 20.0 | 10.0 | 57.1 | 28.6 | 14.3 |
| Comparative Preparation Example 3 | 1:1 | 30.0 | 5.0 | 25.0 | 40.0 | 7.2 | 35.7 | 57.1 |

Preparation of Polyamideimide Film

Example 1

The polyamideimide copolymer obtained in Preparation Example 1 was dissolved in dimethylacetamide to prepare a polymer solution having a concentration of about 25% (w/v). The polymer solution was poured onto a glass substrate, and the thickness of the polymer solution was uniformly adjusted using a film applicator. Then, the solution was dried at 70° C. for 5 minutes and at 100° C. for 10 minutes in a vacuum oven, and the formed film was peeled off.

The peeled film was fixed to the frame of the vacuum oven and then cured at 250° C. for 30 minutes while flowing nitrogen to obtain a polyamideimide film having a thickness of 53.2 μm.

Example 2, Example 3, and Comparative Examples 1 to 3

Polyamideimide films having a thickness shown in Table 1 below were obtained in the same manner as in Example 1, except that the polyamideimide copolymers obtained in Preparation Example 2, Preparation Example 3, and Comparative Preparation Examples 1 to 3 were used respectively.

Experimental Example

The physical properties of the polyamideimide films prepared in Examples 1 to 3 and Comparative Examples 1 to 3 were evaluated by the following methods, and the results are shown in Table 2 below. The transmittance graphs of Example 2 and Comparative Example 1 is shown in FIG. 1.

(1) Pencil Hardness

The pencil hardness of the film was measured according to the measurement method of ASTM D3363 using a pencil hardness tester. Specifically, a pencil of various hardness was fixed on the tester and scratched on the film, and the degree of occurrence of a scratch on the film was observed with a naked eye or a microscope. When there was no scratch of 70% or more of the total number of scratches, a value corresponding to the hardness of the pencil was evaluated as the pencil hardness of the film.

(2) Elastic Modulus, Tensile Strength, and Tensile Elongation

The elastic modulus, tensile strength, and tensile elongation were measured according to the measurement method of IPC-TM-650 using a tensile strength measuring device (manufacturer: Instron, model: 3345 UTM).

(3) Yellow Index (Y.I.)

The yellow index of the film was measured according to the measurement method of ASTM E313 using a COH-400 Spectrophotometer (NIPPON DENSHOKU INDUSTRIES).

(4) Transmittance (T)

The total light transmittance of the film was measured using a UV-VIS-NIR Spectrophotometer (SolidSpec-3700, SHIMADZU), and the transmittance for visible light at a wavelength of 550 nm is shown in Table 2 below.

(5) UV-Cut Off Wavelength(λ) and UV-Cut Slope (dT/dλ)

The UV-cut off wavelength (λ) and UV-cut slope (dT/dλ) of the film were measured according to the measurement method of ASTM E424 using a UV-Vis spectrophotometer (manufacturer: Shimadzu, model: UV2600). The UV-cut slope (dT/dλ) was measured in the range of 10% to 80% transmittance, and the UV-cut off was expressed as the wavelength when the transmittance was less than 1%.

TABLE 2

| | Aromatic dicarbonyl monomer | | | Thickness (μm) | Pencil hardness | Elastic modulus (GPa) | Tensile strength (MPa) | Tensile elongation (%) | Y.I. | T (%) | λ (nm) | dT/dλ |
|---|---|---|---|---|---|---|---|---|---|---|---|---|
| | BPC (mole %) | IPC (mole %) | TPC (mole %) | | | | | | | | | |
| Example 1 | 14.3 | 28.6 | 57.1 | 52.1 | 2H | 4.97 | 228 | 26 | 3.12 | 89.5 | 383 | 2.88 |
| Example 2 | 28.6 | 28.6 | 42.8 | 50.4 | 2H | 5.41 | 241 | 22 | 3.17 | 89.1 | 384 | 2.91 |
| Example 3 | 42.85 | 14.3 | 42.85 | 51.3 | 2H | 5.9 | 268 | 30 | 3.05 | 89.1 | 389 | 2.94 |
| Comparative Example 1 | — | 28.5 | 71.5 | 53.2 | H | 4.44 | 175 | 17 | 3.18 | 88.9 | 378 | 2.59 |
| Comparative Example 2 | 57.1 | 28.6 | 14.3 | 50.8 | Measurement not possible | 6.42 | 300 | 25 | Measurement not possible | Measurement not possible | Measurement not possible | Measurement not possible |
| Comparative Example 3 | 7.2 | 35.7 | 57.1 | 49.2 | H | 4.52 | 166 | 25 | 3.09 | 88.9 | 383 | 2.78 |

Referring to Table 2 and FIG. 1, it was confirmed that, as for the film according to Comparative Example 2 having a high content of BPC, it was impossible to measure the optical-related physical properties due to haze, whereas the films according to Examples, in which an appropriate amount of BPC was used, not only had improved scratch resistance due to high pencil hardness compared to the films according to Comparative Examples, but also showed excellent mechanical properties and increased UV-cut slope.

The invention claimed is:

1. A polyamideimide film comprising a polyamideimide copolymer which is an imidization product of polyamic acid comprising copolymerized aromatic diamine monomer, aromatic dianhydride monomer, and aromatic dicarbonyl monomer,
   wherein the aromatic dicarbonyl monomer is contained in an amount of 51 mol % or more based on the total moles of the aromatic dianhydride monomer and the aromatic dicarbonyl monomer,
   wherein the aromatic dicarbonyl monomer comprises 10 mol % to 50 mol % of 4,4'-biphenyldicarbonyl chloride, 10 mol % to 30 mol % of isophthaloyl chloride, and 40 mol % to 60 mol % of terephthaloyl chloride based on the total moles of the aromatic dicarbonyl monomer, and
   wherein the UV-cut slope (dT/dλ) measured for a film specimen having a thickness of 25 to 55 μm according to ASTM E424 is at least 2.88 in the range of 10% to 80% transmittance.

2. The polyamideimide film of claim 1, wherein the aromatic diamine monomer is 2,2'-bis(trifluoromethyl)-4,4'-biphenyldiamine.

3. The polyamideimide film of claim 1, wherein the aromatic dianhydride monomer is 3,3',4,4'-biphenyltetracarboxylic acid dianhydride.

4. The polyamideimide film of claim 1, wherein the pencil hardness measured for a film specimen having a thickness of 25 to 55 μm according to ASTM D3363 is 2H or higher.

5. The polyamideimide film of claim 1, wherein the tensile strength measured for a film specimen having a thickness of 25 to 55 μm according to ASTM D638 is 180 MPa or more.

\* \* \* \* \*